United States Patent [19]
Eoll

[11] Patent Number: 5,212,756
[45] Date of Patent: May 18, 1993

[54] FIBER OPTIC RIBBON CABLE INCLUDING FLEXIBLE WEB

[75] Inventor: Christopher K. Eoll, Hickory, N.C.

[73] Assignee: Siecor Corporation, Hickory, N.C.

[21] Appl. No.: 822,764

[22] Filed: Jan. 21, 1992

[51] Int. Cl.⁵ .............................. G02B 6/44
[52] U.S. Cl. ...................... 385/114; 385/109; 385/110; 385/112; 385/113; 385/128
[58] Field of Search ............ 385/100, 103, 107, 109, 385/111, 113, 114, 115, 128

[56] References Cited

U.S. PATENT DOCUMENTS

| | | | |
|---|---|---|---|
| 4,110,001 | 8/1978 | Okszewski et al. | 385/114 |
| 4,188,088 | 2/1980 | Andersen | 385/114 |
| 4,199,224 | 4/1980 | Oestreich | 385/113 |
| 4,443,657 | 4/1984 | Hill et al. | 385/141 |
| 4,468,089 | 8/1984 | Brorein | 385/114 |
| 4,709,983 | 12/1987 | Plessner et al. | 385/113 |
| 4,752,112 | 6/1988 | Mayr | 385/114 |
| 4,878,732 | 11/1989 | Rohner et al. | 385/114 |
| 4,952,020 | 8/1990 | Huber | 385/114 |
| 4,984,859 | 1/1991 | Fujigaki et al. | 385/114 |
| 5,067,830 | 11/1991 | McAlpine et al. | 385/114 |
| 5,121,459 | 6/1992 | Chiang | 385/114 |

FOREIGN PATENT DOCUMENTS

| | | | |
|---|---|---|---|
| 2507583 | 8/1984 | Fed. Rep. of Germany | 385/113 X |
| 3839109 | 5/1990 | Fed. Rep. of Germany | 385/113 X |

Primary Examiner—Brian Healy
Attorney, Agent, or Firm—Roy B. Moffitt

[57] ABSTRACT

An optical fiber ribbon composite, each ribbon joined to adjacent ribbon by a flexible web member, the web member having sufficient length so that the optical fiber ribbons can be moved to positions where the plane delimited by the optical fibers of any given ribbon is spaced apart from, but generally parallel with the plane(s) delimited by the optical fibers of the other ribbons of the composite. One or more of the composites is used as a component of a fiber optic cable.

14 Claims, 5 Drawing Sheets

FIBER OPTIC RIBBON CABLE INCLUDING FLEXIBLE WEB

BACKGROUND OF THE INVENTION

A recent trend is to use one or more fiber optic ribbons disposed in a tubular jacket to form a fiber optic cable. When such a cable is bent, which is usually the case when the cable is put to use in its intended environment, the ribbons within the cable also bend. When the plane of bend is the same plane delimited by the width of the ribbon, at least over a short distance, the optical fibers (usually made of glass) experience the most severe strain that can arise out of bending the ribbon. This strain can be mathematically expressed in relative terms as $R_1/R_2$ where $R_1$ is the distance from the center of either one of the terminal fibers to the center of the ribbon itself and $R_2$ is the radius of curvature of the center line of the ribbon itself. See FIG. 5.

Lower strains are more desirable than higher strains for obvious reasons, e.g., fiber breakage and strain-induced attenuation. The fewer the number of fibers in a given ribbon, the smaller the ribbon width and thus the smaller value of $R_1$ and the smaller $R_1/R_2$ strain ratio for a given radius of curvature $R_2$. For a cable of a given fiber count, ribbons having the smallest per each fiber count (smaller ribbon width) is the most desirable from a strain standpoint. However, from a fiber organizational standpoint, it would be more desirable to have as few ribbons as possible, i.e., wide width ribbons. Thus, the strain $R_1/R_2$ and ribbon organization appear to be at odds with one another. It is to the solution of this problem that this invention is directed, wherein so called wide ribbons for organizational purposes can be used without increasing the $R_1/R_2$ strain factor.

BRIEF DESCRIPTION OF THE INVENTION

Structurally, the invention is two or more optical fiber ribbons, each joined to at least one other ribbon by a flexible web member to form a composite, the web member having a sufficient length so that the optical fiber ribbons can be moved to positions wherein the plane delimited by the optical fibers of any given ribbon is spaced apart from but generally parallel with the plane(s) delimited by the optical fibers of the other ribbons of the composite. One or more of these composites are used as a component of a fiber optic cable, for example, in a slotted core ribbon cable as described in U.S. Pat. Nos. 4,199,224 and 4,110,001, the contents of which are incorporated hereby by reference. In such a combination, the folded fiber optic ribbon of this invention could be used as a substitute for the optical transmission elements of the aforementioned patents. See also FIGS. 4, 6, and 7.

DETAILED DESCRIPTION OF THE INVENTION

Figure 1:
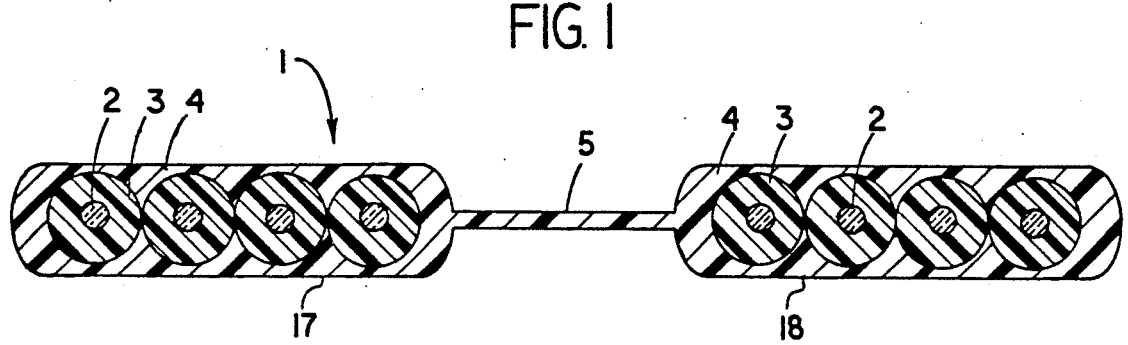
FIG. 1 is a cross sectional view of an optical fiber two ribbon composite, in which a first ribbon is joined to a second ribbon by a web and both first and second ribbons lie essentially in the same plane.

Reference is made to FIG. 1 where element 1 shows two ribbons 17 and 18 joined together by web 5. In the embodiments shown, each ribbon is made up of a group of four optical fibers 2, each fiber 2 circumscribed by plastic 3. Usually, this is a double coating (not shown), well known in the prior art. The four optical fibers are then circumscribed in a plastic 4 to form ribbon 17 and joined to another optical fiber ribbon 18 in the right-hand side of FIG. 1 by web 5. The material 4 circumscribing the coated fibers and also forming the web 5 (sometimes called a hinge) could be urethane acrylate, nylon, a polyester (e.g., polybutylene terephthalate) or polyethylene terephthalate, sold under the registered trademark Mylar.

Figure 2:
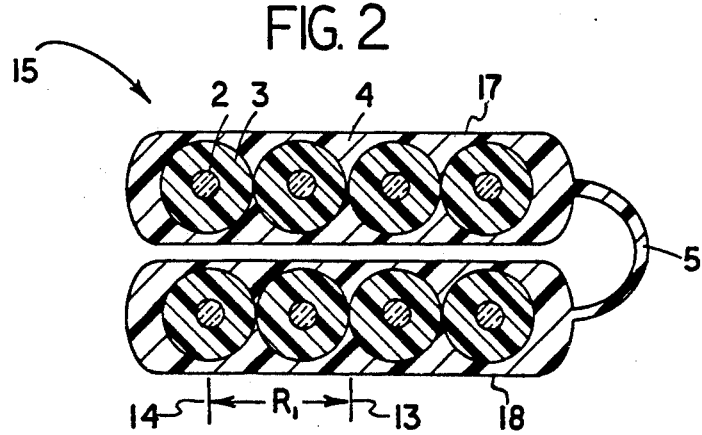
FIGS. 2 AND 3 are cross sectional views of two and four ribbon composites respectively, in which each ribbon of a given composite is joined by a web to at least one adjacent ribbon and the plane delimited by the optical fibers each ribbon in a given composite is spaced apart from and generally parallel with the plane delimited by the optical fibers of any other ribbon in the same composite.
Figure 3:
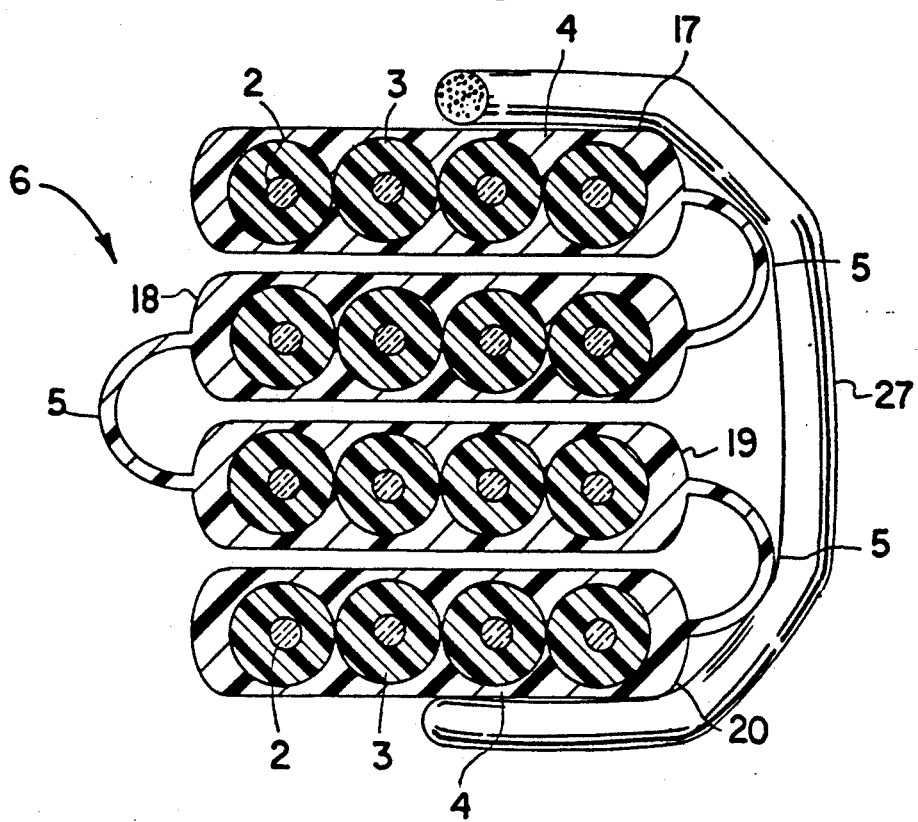

In some instances, the ribbons would preferably be made using a vertical, rather than a horizontal production line so as to more easily prevent deformation of the web. In a horizontal line, the web may sag after leaving the forming die before reaching the curing station in the case of a curable plastic or before reaching a cooling apparatus in the case of a thermoplastic resin. The ribbon shown by element 1 is exemplary only. It can be made containing many individual ribbons, each ribbon joined to at least one other ribbon by a web 5. See FIG. 3 for example. After element 1 is made, it is usually folded over to a configuration such as shown in FIGS. 2 and 3 and may be secured by a conventional binder such as a cord 27 or tape. See FIG. 3, element 27 for example. Cutting of binder cord 27 obviously releases ribbon 6 to be outfolded like that shown by element 1 in FIG. 1. In the alternative, element 15 of FIG. 2 can be manufactured per se, i.e., in the folded state, if desired. The invention could be made in the configuration shown by element 6, in which case no binder cord is necessary.

Figure 6:
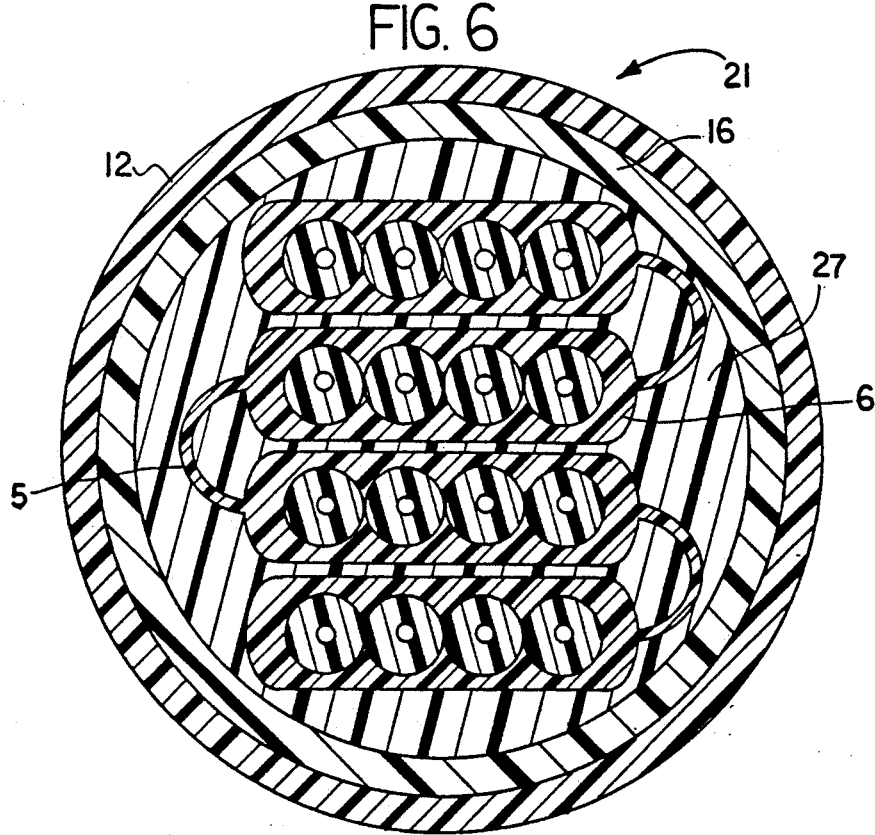
FIG. 6 is a cross sectional view of a single tube cable in which the folded ribbon of FIG. 3 is employed.
Figure 9:
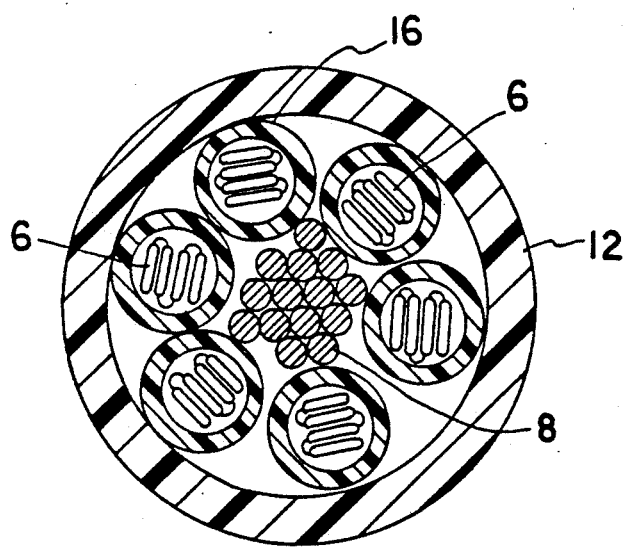
FIG. 9 is a cross sectional view of a multi-tube cable employing tubes like that shown in FIG. 6.

Shown in FIG. 3 by element 6 is a four-ribbon composite, each ribbon (elements 17, 18, 19, and 20) connected to at least one other ribbon by web 5. It will be noted that the ribbons in FIGS. 2 and 3 each have optical fibers that lie in a plane spaced apart from and essentially parallel to a plane delimited by the optical fibers of each of the other optical fiber ribbons. The composite ribbon of either FIGS. 2 or 3, namely elements 15 or 6 can be used in their intended environment as shown in FIGS. 4, 6, and 7, which are cross sections of cables, either slotted core cable (FIGS. 4 and 7) or single or multi-tube cable (FIGS. 6 and 9).

Figure 4:
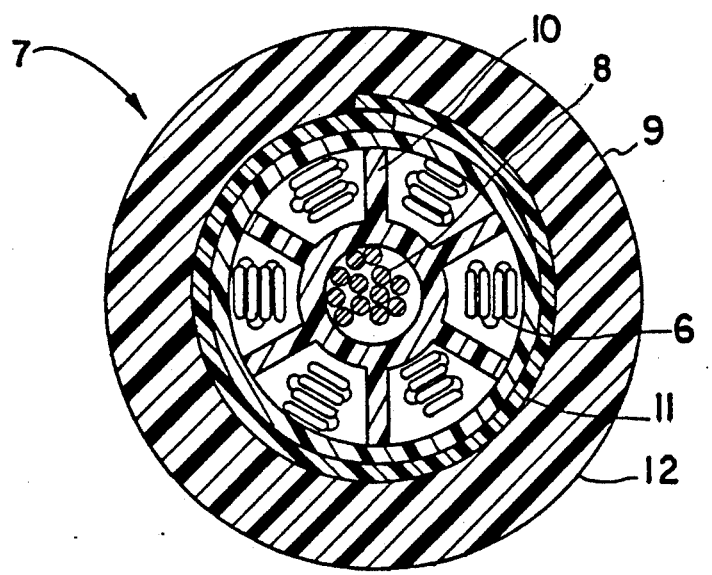
FIG. 4 is a cross sectional view of a slotted core fiber optic cable employing the invention shown in FIG. 3.

The slotted core cable 7 of FIG. 4 is composed of strength elements 8 (usually made of steel or GRP rod), circumscribed by a plastic ring 9 on which, in this example, there are six radiating spokes that create cavities in which ribbon 6 is disposed. Surrounding the ribbon 6 and cavities formed by upstanding spokes 10 is plastic member 11 and a jacket 9. Depending on the distance between spokes 10 and the depth of a cavity formed by the upstanding spokes, ribbon 6 may or may not require a binder cord, if made in the non-folded mode (FIG. 1). Excess lateral or vertical space may require a cord. The opposite may not require such.

Ribbon composite 6 or 15 can be placed in a single tube and used as such. See FIG. 6. Or, a plurality of such tubes can be stranded about a strength member or about themselves and the stranded composite used as a component of a cable. Extruding jacket 12 there over forms a cable. An example of a single-tube cable is shown in FIG. 6 by element 21. In tube 16, there is disposed stacked ribbon composite 6 and grease 27. Jacket 12 circumscribes tube 16. A plurality of tubes can be used, either in combination with a strength member(s) or per se, all stranded together and about which a jacket is extruded. See FIG. 9, where tubes 16 contain folded ribbon composite 6, are stranded about strength member 8 and are circumscribed by jacket 12.

Figure 7:
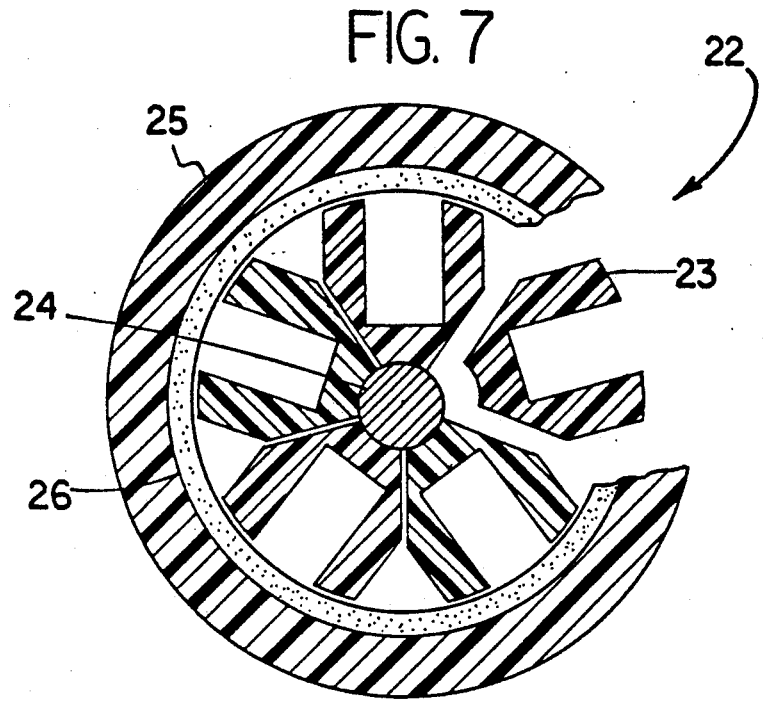
FIG. 7 is a cross sectional view of a slotted core fiber optic cable employing the invention.
Figure 8:
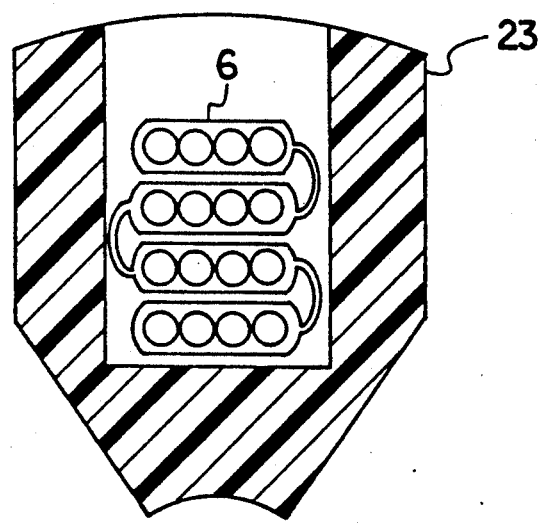
FIG. 8 is a cross sectional view of a "U" shaped member of FIG. 7, in which the ribbons of the present invention may be disposed.

Element 22 of FIG. 7 is a slotted core type cable embodiment in which the invention finds utility. Such an embodiment is comprised of a central strength member 24 (steel or GRP) about which there is disposed a plurality of "U" shaped channels 23, each of which has a cavity delimited by the channel's side walls and bottom, in which either ribbon composite 6 or 15 may be disposed. About the stranded "U" shaped members is plastic member 26 and jacket 25. Grease (not shown) can be added to the cavities of FIGS. 4 and 7 if desired.

Figure 5:
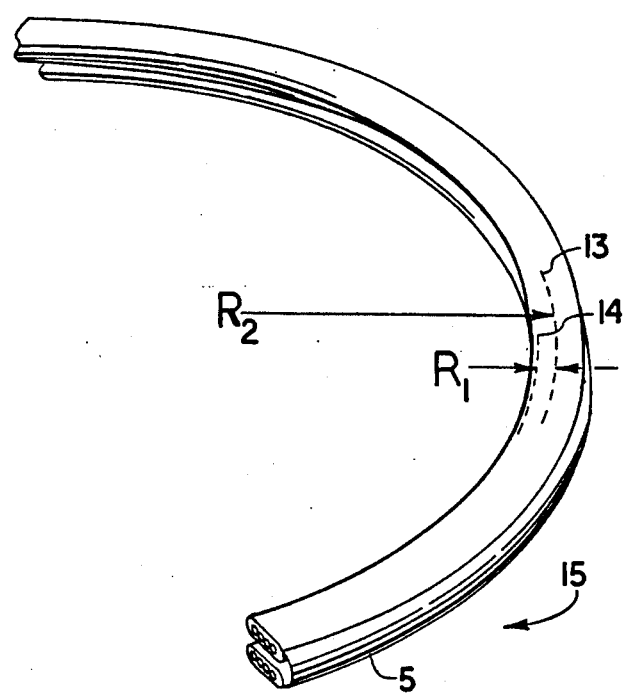
FIG. 5 is an isometric plan view of the ribbons of FIG. 2 showing $R_1$ and $R_2$, which can be used to mathematically show the strain relationship on a fiber.

Shown in FIG. 5 is an isometric plan view of ribbon composite 15 (FIG. 2) bent in a most severe manner by bending the ribbon composite in the planes in which the ribbons 17-18 lie. When the plane of bend is the same plane as delimited by the width of a ribbon, the optical fibers furthest from the center line of the ribbon experience the most severe strain that can arise out of a bending, namely, with respect to the center of a curvature delimited by a bend, the fibers nearest to the center of curvature undergo compression and the fibers furthest therefrom can undergo an equal strain but in tension. This strain can be mathematically expressed in relative terms as $R_1/R_2$, where $R_1$ is the distance from the center line of either terminal fiber to the center line of the ribbon itself. $R_2$ is the radius of curvature of the center line of the ribbon itself as it is bent. See FIG. 5. The radius of curvature $R_2$ is the radius of a circle that would otherwise be circumscribed by a ribbon that was bent a full 360 degrees, measured from the center of that circle to the center line of the ribbon itself. Note element 13, the center line of the ribbon.

If the ribbon of element 1 is formed in unfolded state, it can be folded and constrained to stay in the folded state by means of one or more binder threads, cords, or tapes, with or without a longitudinal wrap over the ribbon. Such member could be placed in a large cavity in the cable or in a tube having excess space by itself because the cavity size or tube size would not be the means by which the ribbon is constrained to remain folded.

It can be readily seen from FIGS. 2, 3, 4, and 6, when a terminal portion of a cable of FIGS. 4, 6, and 9 are stripped to expose the ribbons, the ribbons being connected together by a web can be unfolded. Because of their being joined one to another, they form an element of predetermined organization (colored for example) handy to the craftsman. Because one color (element of organization) could denote an entire family and are joined together, the organization and identification of a particular fiber within that family is readily achieved. Specifically, if color is the identifier, a cable using the invention of elements 15 and 6 need only half or one quarter respectively as many colors as one that does not use the invention.

That which has been disclosed above is a foldable fiber optic ribbon composite. It will be understood that various changes in the details, materials, arrangement of parts, which have been described and illustrated in order to explain the nature of the invention may be made by those skilled in the art within the principles and scope of the instant invention.

What is claimed is:

1. A fiber optic cable component comprising:
   (a) first and second optical fiber ribbons in which each ribbon contains a plurality of optical fibers and each optical fiber is circumscribed by a coating, said optical fibers disposed in a single plane in an adjacent and essentially coating to coating touching relationship one to another and are circumscribed by a plastic material;
   (b) a first flexible web connected to said first and second optical fiber ribbons; and,
   (c) the optical fibers of said first optical fiber ribbon delimit a plane that is spaced apart from and essentially parallel to a plane delimited by the optical fibers of said second optical fiber ribbon and the lateral edges of said first and second optical fiber ribbons are co-extensive with one another.

2. The fiber optic cable component of claim 1 further including a third optical fiber ribbon composed of a plurality of optical fibers, each optical fiber circumscribed by a coating, said optical fibers disposed in a single plane in adjacent and essentially coating to coating touching relationship one to another and are circumscribed by a plastic material, a second flexible web connecting said second optical fiber ribbon to said third optical fiber ribbon and the optical fibers of said third optical fiber ribbon delimiting a plane that is spaced apart from and essentially parallel to the planes delimited by the optical fibers of said first and second optical fiber ribbons and the lateral edges of said first, second, and third optical fiber ribbons are co-extensive with one another.

3. The fiber optic cable component of claim 1 further including a binder circumscribing said first and second optical fiber ribbons.

4. The fiber optic cable component of claim 2 further including a binder circumscribing said fist, second, and third optical fiber ribbons.

5. The fiber optic cable component of claim 1 further including a tubular member in which said first and second optical fiber ribbons are disposed.

6. A fiber optic cable comprising:
   (a) first and second optical fiber ribbons in which each ribbon contains a plurality of optical fibers and each optical fiber is circumscribed by a coating, said optical fibers disposed in a single plane in an adjacent and essentially coating to coating touching relationship one to another and are circumscribed by a plastic material;
   (b) a first flexible web connected to said first and second optical fiber ribbons;

(c) the optical fibers of said first optical fiber ribbon delimit a plane that is spaced apart from and essentially parallel to a plane delimited by the optical fibers of said second optical fiber ribbon and the lateral edges of said first and second optical fiber ribbons are co-extensive with one another;
(d) a tubular member in which said first and second optical fiber ribbons are disposed forming a cable core; and,
(e) a plastic sheath circumscribing said cable core.

7. The fiber optic cable of claim 6 wherein said cable core comprises a plurality of said tubular members stranded about one another.

8. The fiber optic cable of claim 6 further including a third fiber optic ribbon composed of a plurality of optical fibers each optical fiber circumscribed by a coating, said optical fibers disposed in a single plane in an adjacent and essentially coating to coating touching relationship one to another and are circumscribed by a plastic material and a second flexible web connecting said second optical fiber ribbon to said third optical fiber ribbon and the optical fibers of said third optical fiber ribbon delimit a plane that is spaced apart from and essentially parallel to the planes delimited by the optical fibers of said first and second optical fiber ribbons and the lateral edges of said first, second, and third optical fiber ribbons are co-extensive with one another.

9. The fiber optic cable of claim 8 wherein said cable core comprises a plurality of said tubular members stranded about one another.

10. A fiber optic cable comprising:
(a) a central strength member;
(b) one or more elongated open top members positioned about said strength member, each open top member delimiting a cavity, said cavity containing first and second optical fiber ribbons n which each ribbon contains a plurality of optical fibers and each optical fiber is circumscribed by a coating and disposed in a single plane in adjacent and essentially coating to coating touching relationship one to another and are circumscribed by a plastic material, said first and second optical fiber ribbons connected together by a first flexible web member wherein the optical fibers of said first optical fiber ribbon delimit a plane that is spaced apart from and essentially parallel to a plane delimited by the optical fibers of said second optical fiber ribbon and the lateral edges of said first and second optical fiber ribbons are co-extensive with one another; and,
(c) a sheath circumscribing said one or more open top elongated members.

11. The optical fiber cable of claim 10 wherein said one or more open top members are individual members not attached to any other member or to said strength member.

12. The fiber optic cable of claim 10 wherein said one or more open top members are delimited by a central member having thereon a plurality of outwardly protruding spaced apart members.

13. The fiber optic cable of claim 10 further including a binder circumscribing said first and second ribbons.

14. The fiber optic cable of claim 10 further including a third optical fiber ribbon composed of a plurality of optical fibers each circumscribed by a coating disposed in a single plane in adjacent and essentially coating to coating touching relationship one to another and are circumscribed by a plastic material, a second flexible web connecting said second optical fiber ribbon to said third optical fiber ribbon and the optical fibers of the third optical fiber ribbon delimit a plane that is spaced apart and essentially parallel to the planes delimited by the optical fibers of said first and second optical fiber ribbons and the lateral edges of said first, second, and third optical fiber ribbons are co-extensive with one another.

* * * * *